(12) United States Patent
Brunson

(10) Patent No.: US 8,233,606 B2
(45) Date of Patent: Jul. 31, 2012

(54) CONFERENCE CALL HOLD WITH RECORD AND TIME COMPRESSION

(75) Inventor: Gordon R. Brunson, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 583 days.

(21) Appl. No.: 12/484,412

(22) Filed: Jun. 15, 2009

(65) Prior Publication Data

US 2010/0316207 A1  Dec. 16, 2010

(51) Int. Cl.
*H04M 3/42* (2006.01)
(52) U.S. Cl. .................... 379/204.01; 370/260
(58) Field of Classification Search ............. 379/202.01, 379/204.01; 370/260; 709/204, 207
See application file for complete search history.

(56) References Cited

U.S. PATENT DOCUMENTS

| 7,003,286 | B2 | 2/2006 | Brown et al. |
| 7,085,558 | B2 | 8/2006 | Berstis et al. |
| 2005/0119005 | A1* | 6/2005 | Segal et al. ................. 455/445 |
| 2008/0232556 | A1* | 9/2008 | Gilbert et al. ............. 379/88.01 |
| 2008/0299948 | A1* | 12/2008 | Rosener ................... 455/412.2 |
| 2009/0177743 | A1* | 7/2009 | Ashour et al. ............... 709/204 |
| 2009/0296908 | A1* | 12/2009 | Lee et al. ................ 379/202.01 |

OTHER PUBLICATIONS

Lee et al., U.S. Appl. No. 12/127,433, "Telecommunications Endpoint that Prompts a User to Focus on a Monitored Call", filed May 27, 2008, 25 pages.

* cited by examiner

*Primary Examiner* — Creighton Smith
(74) *Attorney, Agent, or Firm* — Sheridan Ross P.C.

(57) ABSTRACT

The present invention provides methods, devices, and systems for allowing a conference call participant to place a conference call on hold. Additionally, a participant is provided with a number of rejoin and/or hold options that can be executed when the participant puts the conference call on hold and takes the conference call off of hold. The rejoin and/or hold options available to the participant may vary depending upon participant preference or the nature in which the participant is rejoining the conference call.

22 Claims, 4 Drawing Sheets

CONFERENCE CALL HOLD WITH RECORD AND TIME COMPRESSION

FIELD OF THE INVENTION

The invention relates generally to telecommunications and more particularly to conference call hold mechanisms.

BACKGROUND

Often business communications involve consultation with three or more parties. Sometimes during a conference call a user may be disconnected from the call, either purposely or inadvertently. When the user is disconnected it may be difficult for the user to catch up on the portion of the conference that was missed; thus, the user may not understand the context of the current conversation because of the missed portion. Also, if the user disconnects purposefully or puts the conference call on hold, the user is not aware of what is occurring in the conference call.

SUMMARY

Some systems have been developed to address the problem of inadvertent disconnection from a conference call. For example, U.S. Pat. No. 7,003,286, the entire content of which are hereby incorporated herein by reference, describes a system for identifying users dropped from a conference call and rejoining the user to the call when the user initiates reconnection with the conference. As another example, U.S. Pat. No. 7,085,558, the entire contents of which are hereby incorporated herein by reference, describes a method of recording conference call content and making such recording content available to participants who may become disconnected from the teleconference while it is still in session.

These above-mentioned systems do not provide the user with the ability to switch between the conference call and the live phone call (i.e., put the conference call on hold). Their operation is based on the user disconnecting from the conference call. Without a disconnection, no actions are taken on the conference call for the user.

U.S. patent application Ser. No. 12/127,433, to Lee, the entire contents of which are incorporated herein by reference, describes an endpoint that allows a user to put a conference call on hold and further monitor the activity of the conference call to determine if it is necessary to alert the user and ask them to rejoin the conference call.

Embodiments of the present invention are provided to further enhance a user's ability to put a conference call on hold. More specifically, embodiments of the present invention allow a user to put a conference call on hold and then determine how they want to rejoin the conference. The rejoin options made available to a user may vary depending upon the actions taken while the conference was placed on hold (e.g., was the conference being recorded, was the conference being monitored, was the conference nearing an end, etc.), reasons why the user is rejoining or is being asked to rejoin the conference, the relative importance of the user to the conference, and/or the hierarchical status of the user as compared to other conference participants (e.g., conference participant versus conference organizer or whether the user is a superior or subordinate of other conference participants).

Alternatively, or in addition, a user may determine rejoin options before the conference call is put on hold, thereby altering and controlling the actions are taken on the conference while it is on hold. In accordance with at least some embodiments of the present invention, a user can determine, prior to putting the conference call on hold, what rejoin options they want available when they rejoin the conference. Based on this determination, the conference may or may not be recorded, compressed, stored, converted to text, sent in a message, monitored, etc. depending upon how the user wants to rejoin the conference. As can be appreciated, however, certain actions may be taken even though the user's pre-hold determinations indicate that such actions are not necessary. This allows the user to change their mind and makes available additional rejoin options beyond what a user initially elected before placing the conference call on hold.

Many different rejoin options are provided to a user when they are attempting to rejoin a conference previously placed on hold. As one example, a rejoining user may be allowed to rejoin the conference without reviewing any of the missed content. This is referred to as a quick rejoin. As another example, the rejoining user may be allowed to rejoin the conference immediately while also being provided with a textual representation of the missed portion of the conference. As yet another example, the rejoining user may be provided with an audio recording of the missed portion of the conference prior to being rejoined to the conference. The audio recording may be a time-compressed version of a portion of the original missed portion of the conference, a compressed or uncompressed subset of the original missed portion of the conference (e.g., the first third of the missed portion and/or the last third of the missed portion), or a compressed and complete version of the original missed portion.

In accordance with at least one embodiment of the present invention, a communication method is provided that generally comprises:

during a conference call between at least a first, second, and third participant, providing the at least a first participant with an option to place the conference call on hold;

identifying rejoin options available to the at least a first participant when the at least a first participant takes the conference call off of hold and rejoins the conference call;

receiving a selected rejoin option from the rejoin options;

allowing the at least a first participant to place the conference call on hold;

while the conference call is on hold, initiating at least one action on the conference call according to the selected rejoin option; and allowing the at least a first participant to rejoin the conference call according to the selected rejoin option.

The term "computer-readable medium" as used herein refers to any tangible storage and/or transmission medium that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine," "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

DETAILED DESCRIPTION

The invention will be illustrated below in conjunction with an exemplary communication system. Although well suited for use with, e.g., a system using a server(s) and/or database (s), the invention is not limited to use with any particular type of communication system or configuration of system elements. Those skilled in the art will recognize that the disclosed techniques may be used in any communication application in which it is desirable to place a conference call on hold as well as rejoin a conference call placed on hold.

The exemplary systems and methods of this invention will also be described in relation to communications software, modules, and associated communication hardware. However, to avoid unnecessarily obscuring the present invention, the following description omits well-known structures, network components and devices that may be shown in block diagram form, are well known, or are otherwise summarized.

For purposes of explanation, numerous details are set forth in order to provide a thorough understanding of the present invention. It should be appreciated, however, that the present invention may be practiced in a variety of ways beyond the specific details set forth herein.

Furthermore, while the exemplary embodiments illustrated herein show the various components of the system collocated, it is to be appreciated that the various components of the system can be located at distant portions of a distributed network, such as a communication network and/or the Internet, or within a dedicated secure, unsecured and/or encrypted system. Thus, it should be appreciated that the components of the system can be combined into one or more devices, such as an enterprise server, a PBX, or collocated on a particular node of a distributed network, such as an analog and/or digital communication network. As will be appreciated from the following description, and for reasons of computational efficiency, the components of the system can be arranged at any location within a distributed network without affecting the operation of the system. For example, the various components can be located in a local server, at one or more users' premises, or some combination thereof. Similarly, one or more functional portions of the system could be distributed between a server, gateway, PBX, and/or associated communication device.

Figure 1:
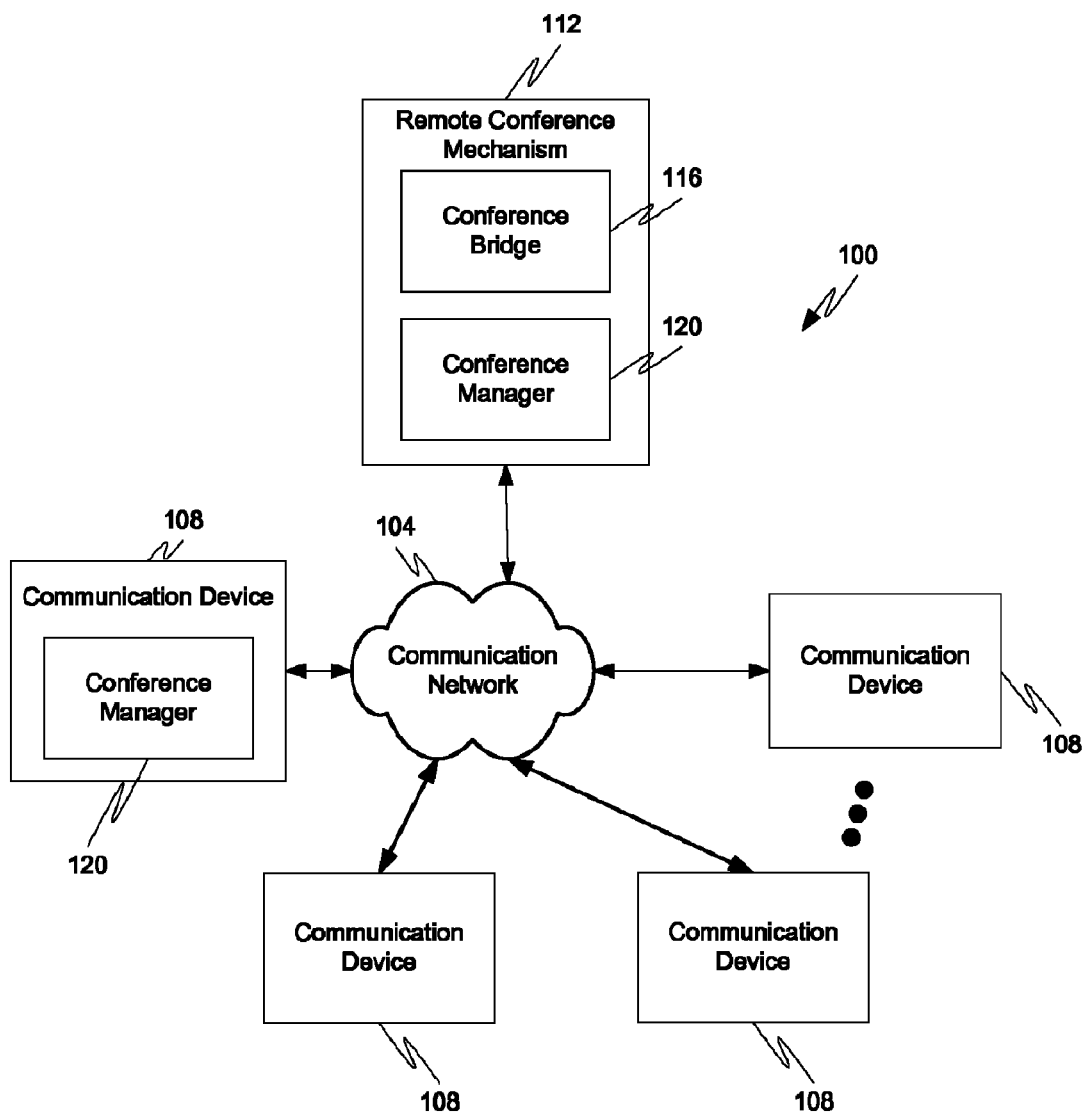
FIG. 1 is a block diagram of a communication system in accordance with embodiments of the present invention.

Referring now to FIG. 1, an exemplary communication system 100 will be described in accordance with at least some embodiments of the present invention. The communication system 100 may comprise a communication network 104 that facilitates communications between one or more communication devices 108 either directly or via a remote conference mechanism 112.

The communication network 104 may be any type of known communication medium or collection of communication mediums and may use any type of protocols to transport messages between endpoints. The communication network 104 may include wired and/or wireless communication technologies. The Internet is an example of the communication network 104 that constitutes and IP network consisting of many computers and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, and any other type of packet-switched or circuit-switched network known in the art. In addition, it can be appreciated that the communication network 104 need not be limited to any one network type, and instead may be comprised of a number of different networks and/or network types.

The communication devices 108 may be any type of known communication or processing device such as a personal computer, laptop, Personal Digital Assistant (PDA), cellular phone, smart phone, telephone, contact center resource, DCP phone, analog phone, or combinations thereof. The communication devices 108 may be controlled by or associated with a single user or may be adapted for use by many users (e.g., an enterprise communication device that allows any enterprise user to utilize the communication device upon presentation of a valid user name and password). In general, each communication device 108 may be adapted to support video, audio, text, and/or data communications with other communication devices 108. The type of medium used by the communication device 108 to communicate with other communication devices may depend upon the communication applications available on the communication device 108.

In accordance with at least one embodiment of the present invention, one or more of the communication devices 108 may comprise a conference mechanism, such as a local conference bridge. The local conference bridge may be adapted to conference (i.e., mix audio inputs and outputs) a limited number of conference call participants at the communication device 108. The size of conference bridge (i.e., the number of participants allowed to engage in a conference) on the communication device 108 may depend upon the processing resources available to the communication device 108.

Additionally, a remote conference mechanism 112 may be provided to further provide conference facilities. The remote conference mechanism 112 may include a conference bridge that can be remotely accessed and utilized by multiple communication devices 108 connected to the communication network 104. Oftentimes, the remote conference mechanism has a plurality of conference bridges, each with a bridge identifier associated therewith. The communication devices 108 may connect with and utilize a particular conference bridge on the conference mechanism by providing the bridge identifier to the remote conference mechanism 112. Additionally, the various conference bridges may be protected with passcodes or passwords, which have been associated with a conference bridge for securing access to that conference bridge.

The size of the conference bridges 116 on the remote conference mechanism 112 may be larger than a conference bridge residing on the communication device 108. Thus, the remote conference mechanism 112 may be more desirable for larger conference calls. In accordance with at least some embodiments of the present invention, a conference call may be transferred from the local conference bridge to the remote conference bridge 116 if the number of participants exceeds the number of participants supported by the local conference bridge. If a conference call is transferred to the remote conference bridge 116 then it may be necessary to transfer all participants (i.e., active conference participants and participants that have placed the conference on hold) to the remote conference bridge 116. In this scenario a conference manager 120 at the communication device 108 hosting the conference may coordinate the transfer with a conference manager 120 residing at the remote conference mechanism 112 to ensure that the transfer of the conference call occurs seamlessly and substantially transparently (i.e., a participant may hear a click or some other minor noise but will be otherwise unaware that the conference call has been transferred).

In addition to managing the transfer of a conference call and other typical conference issues, the conference manager 120 (at the communication device 108 and/or the remote conference mechanism 112) may also be adapted to allow a participant to place the conference call on traditional hold or on background hold. Utilization of background hold would allow ongoing monitoring of the conference as a whisper with special signal processing on the held call (severe amplitude restriction, bandlimiting, and a touch of echo) to suggest to the subconscious mind that a background conversation is in a separate "acoustic space" from the foreground conversation on the new line appearance.

In accordance with at least some embodiments of the present invention a conference manager 120 may be adapted to provide a conference participant with rejoin option prior to or after the participant has placed the conference on hold, execute actions based on the participant's selection of a rejoin option, and allow the participant to rejoin the conference at a later time according to their selected rejoin option. The conference manager 120 may also be adapted to allow the participant to change their rejoin options after they have made an initial selection. For instance, a conference call participant may select a first rejoin option before the conference call is placed on hold and may change their rejoin option to a second rejoin option just prior to rejoining the conference call (i.e., just before the conference is taken off hold).

The types of rejoin options available to a participant include, but are not limited to, rejoining without reviewing any of the missed content, rejoining and receiving an audio recording (i.e., a complete recording, a time-compressed recording to listen to the content at an accelerated speed, a portion of the recording, a portion of the missed content), rejoining immediately and also receiving a message containing an audio recording, receiving a transcription of some or all of the missed content, receiving a transcription with predetermined portions highlighted (e.g., portions of the missed content where a keyword or phrase was detected), and combinations thereof.

The conference manager 120 may also be adapted to monitor the activity of the conference call while a participant has the conference call on hold. If the conference manager 120 detects the occurrence of a key word or phrase or detects an extended period of silence (e.g., more than 2 seconds of silence or "hello, are you there?"—silence—, no response) indicating that other participants are possibly waiting for a comment by the participant who has placed the conference call on hold, the conference manager 120 may be adapted to alert the participant via some sort of audio and/or visual indicator at the participant's communication device 108. Notifications can be provided on a graphical user interface of the communication device 108 or may be provided via a whisper page to the participant if that participant is on another call. Alternatively, the notification could be mixed in the background of the participant's other call with severe limiting. Furthermore, it is not just the notification that could be introduced to the caller using this background technique, but the monitoring of the held call may also be provided to the caller using the background technique described herein. This alert can be answered by the participant and the participant may be allowed to rejoin the conference. Of course, the participant may elect to ignore the notification and keep the conference call on hold.

In accordance with at least some embodiments of the present invention, the participant may have initially (i.e., before placing the conference call on hold) selected a rejoin option that would have allowed the participant to listen to the missed content of the conference at an accelerated speed until the participant caught up with the real-time conference call. However, if the conference manager 120 determines that the participant is needed back immediately by detecting a particular trigger indicating an immediate need for the conference participant, then the conference manager 120 may change the participant's rejoin option (either by participant election or immediately), thereby causing the participant to be rejoined immediately with the conference call without receiving a recording of the conference. Alternatively, the conference participant may be rejoined immediately but may also be provided with an audio or textual representation of the missed conference content.

Figure 2:
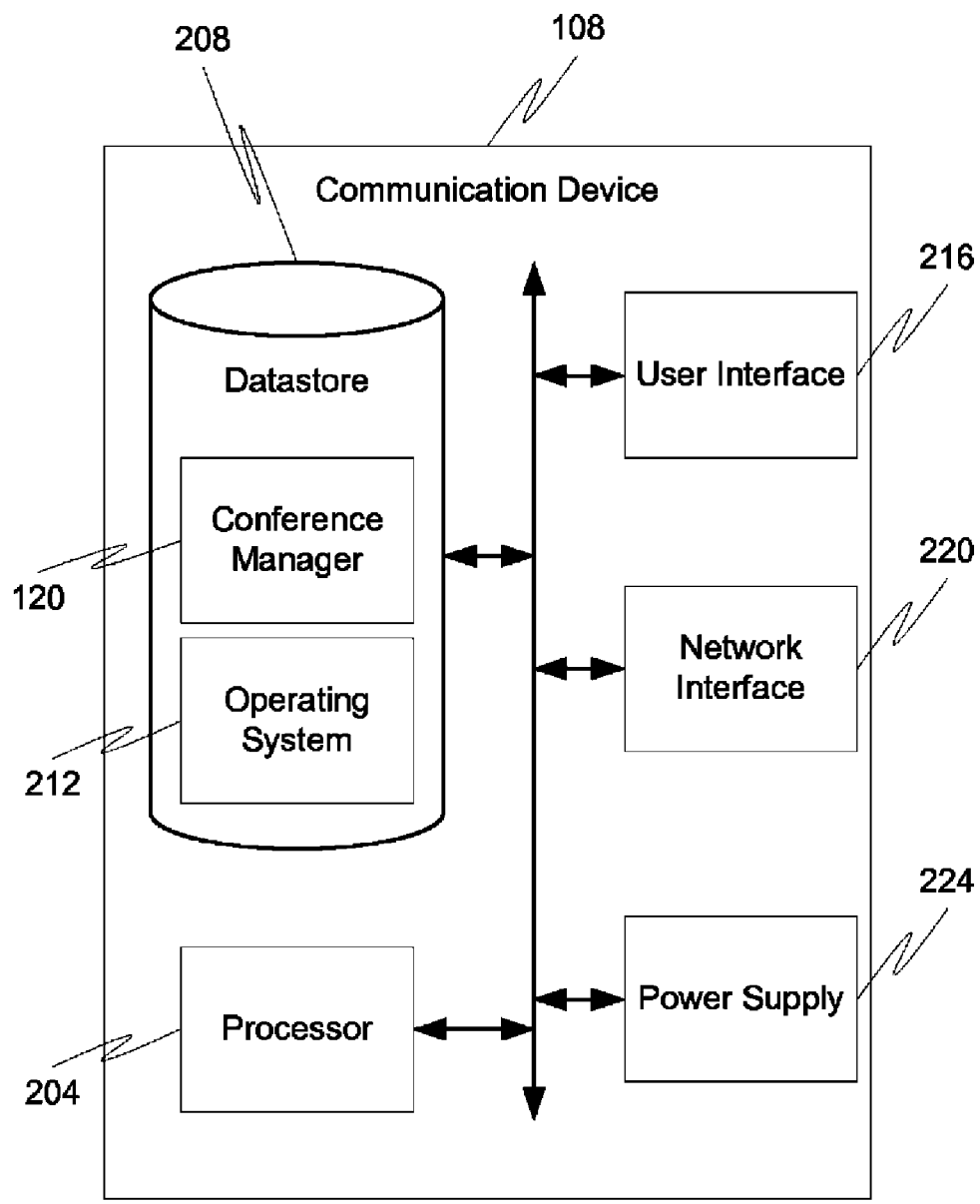
FIG. 2 is a block diagram depicting details of a communication endpoint in accordance with embodiments of the present invention.

With reference now to FIG. 2, an exemplary communication device 108 will be described in accordance with at least some embodiments of the present invention. The communication device 108 may comprise one or more communication applications at least one of which comprises a conference manager 120. The conference manager 120 may comprise a set of instructions stored on a computer-readable medium, such as a datastore 208, that are executable by a processor 204.

The communication device 108 may also comprise communication applications that are adapted to facilitate communications with other communication devices 108 across the communication network 104. More specifically, a communication application may be responsible for managing communication protocols used during a particular communication session as well as facilitate codec negotiation for voice and/or video calls. Exemplary communication applications include, without limitation, voice, video, image, text, email, Instant Messaging, or any other type of known communication application.

In addition to containing the conference manager 120 and other communication applications, the datastore 208 may also contain an operating system 212 that is used as an application for navigating the various other applications available to the communication device 108.

The communication device 108 may further include a user interface 216, a network interface 220, and a power supply 224. The power supply 224 may correspond to an internal power source such as a battery or the like. Alternatively, or in addition, the power supply 224 may comprise a power converter that is adapted to convert AC power received from a power outlet into DC power that can be used by the communication device 108.

The network interface 220 is adapted to connect the communication device 108 to the communication network 104. In accordance with at least some embodiments of the present invention, the network interface 220 may include, but is not limited to, a network interface card, a modem, a wired telephony port, a serial or parallel data port, radio frequency broadcast transceiver, a USB port, or other wired or wireless communication network interfaces.

The user interface 216 may include a user input and/or user output. User inputs that may be included in the user interface 216 include, for example, a microphone, a keyboard, a numeric keypad, and pointing device (e.g., mouse, touch-pad, roller ball, etc.) combined with a screen or other position encoder. Furthermore, the user input may comprise mechanisms for capturing images of a user. More specifically, the user input may comprise a camera or some other type of video capturing device that is adapted to capture a series of images of the user, a video stream, and/or individual images.

Examples of user output devices that may be employed in the user interface 216 include, without limitation, a speaker or headset, an alphanumeric display, a Liquid Crystal Display (LCD), a Light Emitting Diode (LED), a plasma display, a Cathode Ray Tube (CRT) screen, a ringer, and/or indicator lights. In accordance with at least some embodiments of the present invention, a combined user input/output device may be provided as the user interface 216, such as a touch-screen device.

Figure 3:
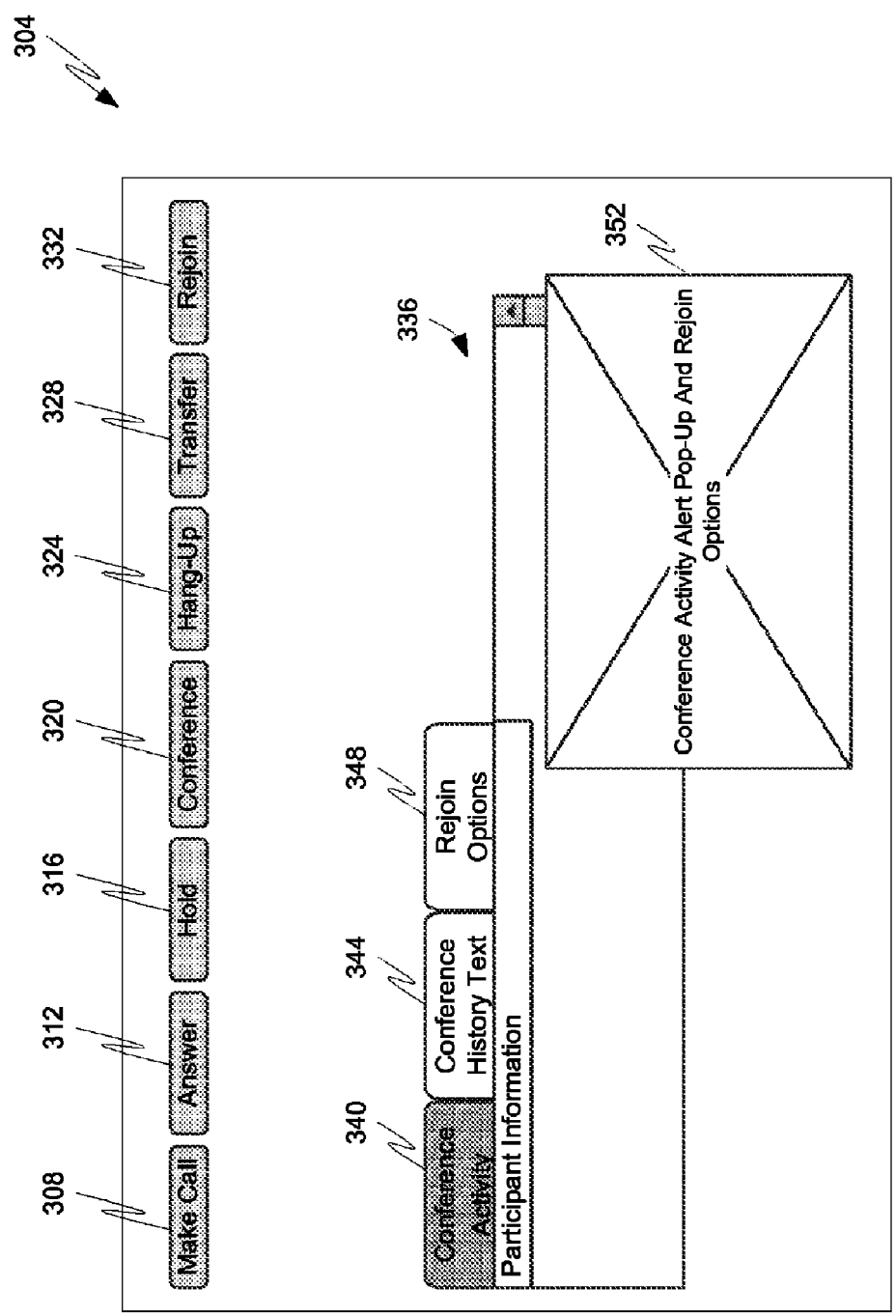
FIG. 3 is a block diagram depicting an exemplary graphical user interface in accordance with embodiments of the present invention.

With reference now to FIG. 3, an exemplary graphical user interface 304 will be described in accordance with at least some embodiments of the present invention. The graphical user interface 304 may be displayed to a user via a user output provided on or associated with the communication device 108. The graphical user interface 304 may be associated with a particular communication application or a general user application (e.g., an operating system). The graphical user interface 304 may be utilized by a user of the communication device 108 to access and implement various functions in accordance with embodiments of the present invention. The graphical user interface 304 may comprise a number of user inputs such as a make call input 308, an answer input 312, a hold input 316, a conference input 320, a hang-up input 324, a transfer input 328, and/or a rejoin input 332. Each of these inputs may be utilized to administer various call functions offered by the communication device 108 and/or other components in the communication system 100.

In addition to its various user inputs, the user interface 304 may also comprise an area for depicting current call information 336. Information depicted in the current call information area 336 may depict any type of information relating to the conference call such as information related to the status of the conference call and its participants under a conference activity tab 340, a conference history text tab 344, and a rejoin option tab 348.

The types of participant information that can be depicted in the conference activity tab 340 includes, but is not limited to, caller identification information, callee identification information, the number or extension of the caller and/or callee, tag information (i.e., whether any tags have been associated with the current call), and whether or not the user of the communication device 108 has placed the conference call on hold. As can be appreciated by one skilled in the art a greater or lesser amount of information may be displayed under the conference activity tab 340, depending upon user needs, preferences, and/or system settings.

The conference history text tab 344 may be used to depict a textual representation of a conference call regardless of whether the conference call has been placed on hold. In accordance with at least some embodiments of the present invention, however, the conference history text tab 344 is adapted to display a textual representation of conference call content that has been missed due to a participant placing the conference call on hold. In accordance with at least one embodiment of the present invention, rather than just providing an auto-transcription of the conference content under the history text tab 344, a number of other conference objects can be displayed including, without limitation, the ongoing visual artifacts of a conference like slides being shared, video streams, text discussion areas of a webconference, or even a dynamic speaker indicator.

The rejoin options tab 348 may be adapted to present various rejoin options that are available to a participant. The options presented under this tab may vary depending upon whether the conference call is already on hold or is about to be placed on hold. More specifically, if the conference call is on hold the rejoin options may be limited by the actions that are currently being performed on the conference call. As an example, if the user initially selected to be immediately reconnected to the conference call as a rejoin option, then the conference manager 120 may not have initiated any recording of the missed content. Accordingly, the rejoin options in the rejoin options tab 348 may not include receiving a recording of the missed content. If however, the user changes their rejoin options while the conference call is on hold, then the conference manager 120 may be adapted to begin recording some of the missed content and can provide that content to the participant prior to rejoining the participant to the conference call. It should be noted that a conference manager 120 may also be more proactive in its role and may always begin recording just in case the user changes his/her mind.

The graphical user interface 304 may also be adapted to depict a monitoring alert notification 352 when the conference manager 120 determines that a participant's attention is required at a conference that has been placed on hold. In accordance with at least some embodiments of the present invention, the notification window 352 may display an alert message such as "Activity has been detected at the conference call on hold, would you like to rejoin?" The notification window 352 may also display a menu of rejoin options that can be selected by the participant prior to taking the conference off hold. The rejoin options provided in the notification window 352 may vary from the rejoin options depicted under the rejoin options tab 348, particularly because the rejoin options depicted in the notification window 352 are specific to a quicker rejoin.

Figure 4:
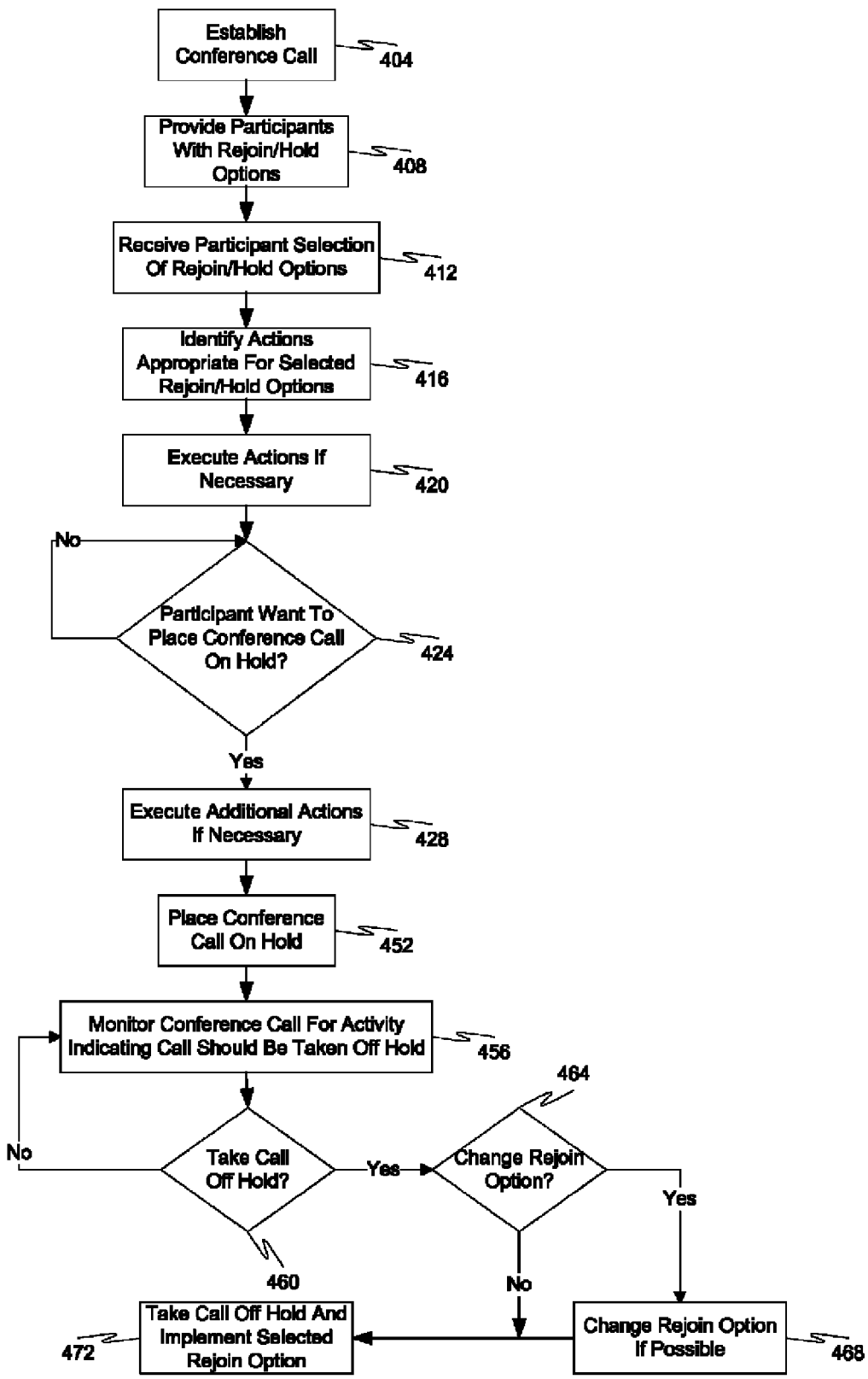
FIG. 4 is a flow diagram depicting a communication method in accordance with embodiments of the present invention.

Referring now to FIG. 4, an exemplary communication method will be described in accordance with at least some embodiments of the present invention. The method is initiated when a conference call is established between three or more participants employing their own communication device 108 (step 404). The method continues by providing one or more of the participants with rejoin and/or hold options in case the participant wants to place the conference call on hold (step 408). The rejoin and/or hold options may be provided to a first participant in response to the first participant receiving a second phone call. Alternatively, the rejoin and/or hold options may be presented to all participants at the onset of the conference call. As another alternative, the rejoin and/or hold options may be provided to the participants prior to establishing the conference call (e.g., in a conference call invitation sent via email). As can be appreciated by one skilled in the art, a participant may not select any rejoin and/or hold options in which case a set of predetermined or default rejoin and/or hold options are selected on behalf of the non-selecting participant.

The participant selections (or default selections) are then received at the conference manager 120 (step 412). In this particular step, the conference manager 120 at each communication device 108 may be responsible for knowing it's participant's selected rejoin and/or hold option and executing actions in accordance with that selection. Alternatively, the remote conference manager 120 may be responsible for knowing several participant rejoin and/or hold options and executing actions in accordance with the multiple selections.

After the participant selections have been received, the method continues with the conference manager 120 identifying actions that are appropriate for the selected rejoin and/or hold option (step 416) and then executing such actions, if necessary (step 420).

The purpose of "hold" in a conventional implementation is to free up the endpoint to do other things not related to the held call (with the exception that the held call occupies a "line appearance" allowing the user to un-hold that same call). The endpoint is frequently used to enter into a sidebar discussion generally unrelated to the primary call appearance.

One type of rejoin and/or hold option may include a preference to invoke severe acoustic limiting as a mechanism for notification of an event on the held conference. This may be executed by the conference manager 120 may monitoring the held conference itself while the user engages the endpoint 108 in a sidebar call.

In certain circumstances it may be beneficial to retain the ability to monitor the held call while using the endpoint on another line appearance to place or answer another call thereby facilitating a sidebar conversation. A user's speaking would never be directed to the held call in the background. If a user implemented a hold option whereby they actually monitored a held call in the background, there would be no reason to time compand the playback to catch up when taken off of hold. This suggests that the treatment during "hold" is related to the selection of rejoin treatment.

If a user elects background hold wherein the original call is held in monitor mode only with amplitude greatly reduced, and perhaps a touch of acoustic echo and bandwidth limiting applied to tell the subconscious mind that it is a conversation taking place in the background, then the most likely rejoin treatment would be to immediately speak to the conference. It might also be desirable to provide a foreground/background control to allow a user to manage which conversation they are speaking to.

If, on the other hand, a user elects the traditional "silent hold" and does not monitor the call themselves, then it may be more beneficial to provide a rejoin treatment that incorporates the use of an accelerated playback.

The type of actions that may be performed prior to a participant placing the conference call on hold include, for example, identifying resources (e.g., recording resources, monitoring resources, speech-to-text conversion resources, etc.) that will be needed if the conference call is placed on hold and ensuring that the appropriate resources are readily available if a participant places the conference call on hold. Thereafter, it is determined whether a participant wants to place the conference call on hold (step 424).

Once it is determined that a participant wants to place the conference call on hold, then the conference manager 120 executes additional actions that will enable the participant to rejoin the conference in accordance with their previously selected rejoin options (step 428). The conference manager 120 also (either simultaneously or just after step 428) allows the participant to place the conference call on hold based on the selected, preferred, or default hold options (step 452).

Embodiments of the present invention combine the pitch-invariant time companding and marking within real-time communication streams of a conference call to allow a participant to shuffle (based on convention means such as time increments or may be based on detected events within the media streams themselves such as detected phrases, sentences, changing talkers, etc.) and catch up to the real-time conversation of a conference call without missing any content of the conference call. Thus, as one example, a participant may be part of a large conference call when she receives another call from her husband. Rather than drop the conference call, the participant places the conference call on hold and answers the incoming call. When the conference call is placed on hold the buffers of the communication device 108 may be flushed and the communication device 108 may begin recording the content of the conference call (e.g., the RTP stream of the conference call). Alternatively, the conference manager 120 on the communication device 108 may signal the conference manager 120 on the remote conference mechanism 112 to begin recording the RTP stream (if it isn't already being done) and may further mark the point in the recording corresponding to the time when the user signaled that she has put the conference on hold. The conference manager 120 may also begin providing the participant with a text conversion of the RTP stream if the participant's initially selected rejoin option indicates that such an action is desired.

While the conference call is on hold, the conference manager 120 is adapted to monitor the conference call for activity indicating that the participant's attention is required back at the conference call (step 456). If such activity is detected, then the conference manager 120 may provide an alert notification to the participant. This process continues until it is determined that the participant wants to take the call off hold (step 460). This determination may be made if the participant responds to an alert notification of if the participant is done with their other call. Alternatively, a user may elect a background hold and may, therefore, be allowed to monitor the content of the conference themselves without relying on the conference manager 120 to analyze the conference while it is on hold.

Once it is determined that the call is to be taken off hold, the participant may be rejoined with the conference call according to their initially selected rejoin option. Alternatively, the participant may be provided with additional rejoin options for catching up with the conference call (step 464). If the participant does not want to change their rejoin option, then the conference call is taken off hold and the selected rejoin option is implemented (step 472). As an example, the participant may be allowed to listen to the recorded version of the conference call at a somewhat accelerated speed until she catches up with the real-time conversation. Alternatively, the participant may be allowed to immediately join the real-time conversation.

If, however, the participant indicates a desired to change their rejoin options, then the conference manager 120 changes the participant's rejoin option, if possible (step 468). This particular step may not be possible if the participant initially elected to rejoin the conference immediately and subsequently tried to change their rejoin option to receiving a recording of the missed content. In this scenario, the subsequent rejoin option may not be available to the participant if the conference manager 120 never initiated a recording of the conference call or never marked the appropriate point in the RTP stream where the conference call was placed on hold. After the rejoin option has been changed, the method continues to step 472.

While the above-described flowchart has been discussed in relation to a particular sequence of events, it should be appreciated that changes to this sequence can occur without materially effecting the operation of the invention. Specifically, a device can address a third party without leaving an existing communication session as long as signaling and addressing occurs outside the audio channel. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this invention can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a phone, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and communication arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with the present invention, systems, apparatuses and methods for putting a conference call on hold. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A communication method, comprising:
   during a conference call between at least a first, second, and third participant, providing the at least a first participant with an option to place the conference call on hold;
   identifying off hold rejoin options available to the at least a first participant when the at least a first participant takes the conference call off of hold and rejoins the conference call;
   receiving a selection of an off hold rejoin option for the at least a first participant;
   allowing the at least a first participant to place the conference call on hold; while the conference call is on hold, initiating at least one action on the conference call according to the selected off hold rejoin option; and
   allowing the at least a first participant to rejoin the conference call according to the selected off hold rejoin option.

2. The method of claim 1, wherein the off hold rejoin option selection occurs after the conference call is placed on hold.

3. The method of claim 1, wherein the off hold rejoin option selection comprises a first off hold rejoin option selected prior to placing the conference call on hold, the method further comprising:
   receiving a second off hold rejoin option selection from the at least a first participant; and
   allowing the at least a first participant to rejoin the conference call according to the second off hold rejoin option instead of the first off hold rejoin option.

4. The method of claim 3, wherein the first off hold rejoin option comprises a default off hold rejoin option.

5. The method of claim 1, wherein the selected off hold rejoin option comprises immediately rejoining the conference call in real-time after the conference call is taken off hold and wherein the at least one action comprises providing at least one of an audio recording and textual representation of at least a portion of the conference call that occurred while the conference call was on hold.

6. The method of claim 1, wherein the conference call is placed on background hold thereby allowing the first participant to monitor the conference call while engaging in a second call.

7. The method of claim 1, further comprising:
   while the conference call is on hold, monitoring activity of the conference call to determine if the at least a first participant is needed on the conference call;
   determining that the at least a first participant is needed on the conference call; and providing an alert notification to the at least a first participant.

8. The method of claim 7, wherein the alert notification comprises the off hold rejoin options available to the at least a first participant.

9. The method of claim 1, wherein the at least one action comprises at least one of (i) when the conference call is placed on hold, initiating a recording of the conference call and (ii) marking a recording of the conference call at a location corresponding to the point in time when the at least a first participant placed the conference call on hold.

10. The method of claim 9, wherein the at least one off hold rejoin option comprises one or more of (a) allowing the at least a first participant to listen to the recording of the conference call at an accelerated speed until the at least a first participant has caught up with the real-time conversation of the conference call and (b) shuffle the recording of the conference call.

11. A computer readable medium comprising non-transitory processor executable instruction operable to perform the method of claim 1.

12. A communication device used by a first participant during a conference call, comprising:
a user interface adapted to receive user input from the first participant and to provide the first participant with input received from other participants in the conference call;
a network interface adapted to send the user input from the first participant to other participants in the conference call; and
a conference manager adapted to place the conference call on hold, thereby preventing transmission of user input received from the first participant to other participants in the conference call while the conference call is on hold, wherein the conference manager is further adapted to identify off hold rejoin options available to the first participant when the first participant takes the conference call off of hold and rejoins the conference call, receive a selection of an off hold rejoin option for the first participant, and, while the conference call is on hold, initiate at least one action on the conference call according to the selected off hold rejoin option.

13. The device of claim 12, wherein the off hold rejoin option selection occurs after the conference call is placed on hold.

14. The device of claim 12, wherein the off hold rejoin option selection comprises a first off hold rejoin option selected prior to placing the conference call on hold, and wherein the conference manager is further adapted to receive a second off hold rejoin option selection from the first participant and allow the first participant to rejoin the conference call according to the second off hold rejoin option instead of the first off hold rejoin option.

15. The device of claim 14, wherein the first off hold rejoin option comprises a default off hold rejoin option.

16. The device of claim 12, wherein the selected off hold rejoin option comprises immediately rejoining the conference call in real-time after the conference call is taken off hold and wherein the at least one action comprises providing at least one of an audio recording and textual representation of at least a portion of the conference call that occurred while the conference call was on hold.

17. The device of claim 12, wherein the selected off hold rejoin option comprises reviewing at least a portion of the conference call that occurred while the conference call was on hold prior to rejoining the conference call in real-time after the conference call is taken off hold and wherein the at least one action comprises providing at least one of an audio recording and textual representation of at least a portion of the conference call that occurred while the conference call was on hold.

18. The device of claim 12, wherein the conference call is placed on background hold thereby allowing the first participant to monitor the conference call while engaging in a second call and wherein while the conference call is on background hold an amplitude of audio associated with the conference call and provided to the first participant is reduced relative to its original amplitude.

19. The device of claim 1, wherein the at least one action comprises at least one of (i) when the conference call is placed on hold, initiating a recording of the conference call and (ii) marking a recording of the conference call at a location corresponding to the point in time when the first participant placed the conference call on hold.

20. A conferencing system, comprising:
a communication manager adapted to allow a first participant to place a conference call on one of (i) silent hold and (ii) background hold, thereby preventing transmission of user input received from the first participant to other participants in the conference call while the conference call is on hold, wherein the conference manager is further adapted to identify off hold rejoin options available to the first participant when the first participant takes the conference call off of hold and rejoins the conference call, receive a selection of an off hold rejoin option for the first participant, and, while the conference call is on hold, initiate at least one action on the conference call according to the selected off hold rejoin option.

21. The system of claim 20, wherein the at least one action comprises at least one of (a) when the conference call is placed on hold, initiating a recording of the conference call and (b) marking a recording of the conference call at a location corresponding to the point in time when the first participant placed the conference call on hold.

22. The system of claim 20, wherein the first participant engages in the conference call via a first communication device and wherein the communication manager resides on a remote conferencing mechanism.

* * * * *